United States Patent [19]

Kobayashi et al.

[11] Patent Number: 5,056,485
[45] Date of Patent: Oct. 15, 1991

[54] CRANK ANGLE SENSOR AND IGNITION TIMING CONTROL SYSTEM USING SAME

[75] Inventors: Sadao Kobayashi; Hisayuki Yamamoto, both of Yokohama, Japan

[73] Assignee: Nissan Motor Co., Ltd., No. 2, Yokohama, Japan

[21] Appl. No.: 529,418

[22] Filed: May 29, 1990

[30] Foreign Application Priority Data

May 29, 1989 [JP] Japan .................................. 1-132792

[51] Int. Cl.⁵ ............................................. F02D 28/00
[52] U.S. Cl. ....................................... 123/414; 123/424
[58] Field of Search ......................... 123/613, 414, 424; 364/431.01, 431.03, 431.1

[56] References Cited

U.S. PATENT DOCUMENTS

| | | | |
|---|---|---|---|
| Re. 31,709 | 10/1984 | Ford | 123/613 |
| 4,355,613 | 10/1982 | Rode et al. | 123/414 |
| 4,385,605 | 5/1983 | Petrie et al. | 123/414 |
| 4,485,785 | 12/1984 | Hill | 123/414 |
| 4,495,927 | 1/1985 | Yamato | 123/424 |
| 4,519,362 | 5/1985 | Arakawa et al. | 123/414 |
| 4,932,388 | 6/1990 | Chiba et al. | 123/414 |
| 4,951,629 | 8/1990 | McAbee et al. | 123/613 |
| 4,951,639 | 8/1990 | Iwata et al. | 123/613 |
| 4,953,531 | 9/1990 | Abe | 123/424 |
| 4,972,818 | 11/1990 | Nomura et al. | 123/424 |

FOREIGN PATENT DOCUMENTS

| | | |
|---|---|---|
| 0284054A2 | 9/1988 | European Pat. Off. . |
| 47-38658 | 9/1972 | Japan . |
| 57-193768 | 11/1982 | Japan . |
| 60-98171 | 6/1985 | Japan . |
| 60-261978 | 12/1985 | Japan . |
| 61-60256 | 12/1986 | Japan . |
| 2157422A | 3/1985 | United Kingdom . |

Primary Examiner—Tony M. Argenbright
Assistant Examiner—Robert Mates
Attorney, Agent, or Firm—Pennie & Edmonds

[57] ABSTRACT

A crank angle sensor comprises a rotor plate formed with first slits for detecting a first cylinder angular position, second slits for a second cylinder angular position, and a third slit for detecting an angular position of a specified cylinder. The first slits are equi-angularly distant one after another and arranged within a predetermined annular band within the rotor plate, and the second slits are equi-angularly distant one after another and arranged within the predetermined annular band. Each of the first slits is located adjacent to the corresponding one of the second slits. In an ignition timing control system using the crank angle sensor, the control is performed by generating a train of pulses including a train of leading pulses and a train of trailing pulses superimposed to each other, determining whether a start switch is turned ON or not, determining whether an engine temperature is greater than a predetermined value or not, and carrying out an ignition at a falling edge of each of the trailing pulses when the engine temperature is greater than the predetermined value, and at a falling edge of each of the leading pulses when the engine temperature is not greater than the predetermined value.

3 Claims, 10 Drawing Sheets

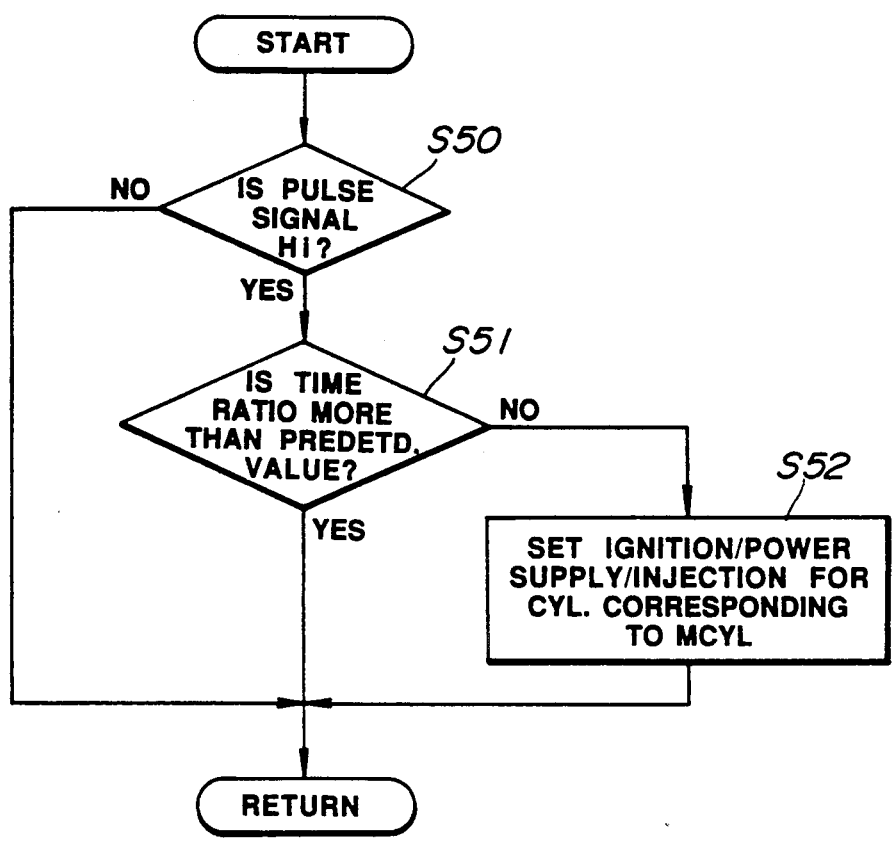

CRANK ANGLE SENSOR AND IGNITION TIMING CONTROL SYSTEM USING SAME

BACKGROUND OF THE INVENTION

The present invention relates to a crank angle sensor and an ignition timing control system using the crank angle sensor.

JP 47-38658 discloses a crank angle sensor including a slit disk or rotor plate, a source of light, and a photo-electric transducer. The rotor plate is coaxially coupled with a shaft of a distributor rotatable with a crankshaft of an engine. The rotor plate is formed with a first group of slits arranged equi-angularly distant one after another within an outer annular zone adjacent the outer periphery of the disc, a second group of slits arranged equi-angularly distant one after another within an intermediate annular zone coaxially and inwardly disposed next to the outer annular area, and a third group of a slit arranged within an inner annular zone coaxially and inwardly disposed next to the intermediate annular zone. The first group of slits are designed for detecting a crankshaft angle, the second group of slits for detecting a cylinder angular position, and the third group of a slit for detecting an angular position of a specified cylinder. The source of light emits three beams of light on the three annular zones, respectively. As the slit disk rotates, the photo-electric transducer generates a pulse when the light passes through each of slits. Three different trains of pulses are generated corresponding to the three groups of slits, and processed so as to provide timing signals which may be used for an ignition timing control or injection timing control or any other timing control necessary for the engine control.

The rotor plate of this known crank angle sensor is complex and weak in structure and thus difficult to manufacture since three groups of slits are formed in three coaxially arranged zones, resulting in increased manufacturing cost.

U.S. patent application Ser. No. 440,559 filed on Nov. 22, 1989, now pending, discloses a crank angle sensor using a less complicated rotor plate. This rotor plate is formed with two groups of slits. The first group of slits are arranged equi-angularly distant one after another within an annular zone adjacent the outer periphery and designed for detecting a cylinder angular position. The second group of a slit is arranged in the same annular zone and designed for detecting an angular position of a specified cylinder.

SUMMARY OF THE INVENTION

An object of the present invention is to provide a crank angle sensor using a rotor plate which is less complicated and less difficult to manufacture and which can provide two different angular positions of each cylinder.

Another object of the present invention is to provide an ignition timing control, using the crank angle sensor, which can generate two different ignition timings including an appropriate ignition timing for cold engine start.

According to one aspect of the present invention, there is provided in a crank angle sensor including:

a rotor plate formed with a first group of slits designed for detecting a first cylinder angular position, a second group of slits designed for a second cylinder angular position, and a third group of a slit designed for detecting an angular position of a specified cylinder, said first group of slits being equi-angularly distant from one another and arranged within a predetermined annular band within said rotor plate, said second group of slits being equi-angularly distant from one another and arranged within said predetermined annular band, each of said slits belonging to said first group being located adjacent to the corresponding one of said slits belonging to said second group.

Specifically, said slit belonging to said third group is arranged within said predetermined annular band.

According to another aspect of the present invention, there is provided a system for controlling an ignition timing in an internal combustion engine having a start switch, comprising:

means for generating a train of pulses including a train of leading pulses and a train of trailing pulses superimposed on each other;

means for determining whether the start switch is turned ON or not;

means for determining whether an engine temperature is greater than a predetermined value or not; and means for carrying out an ignition at a falling edge of each of said trailing pulses when said engine temperature is greater than said predetermined value, and at a falling edge of each of said leading pulses when said engine temperature fails to be greater than said predetermined value.

According to still another aspect of the present invention, there is provided a method of controlling an ignition timing in an internal combustion engine having a start switch, comprising:

generating a train of pulses including a train of leading pulses and a train of trailing pulses superimposed on each other;

determining whether the start switch is turned ON or not;

determining whether an engine temperature is greater than a predetermined value or not;

carrying out an ignition at a falling edge of each of said trailing pulses when said engine temperature is greater than said predetermined value; and carrying out an ignition at a falling edge of each of said leading pulses when said engine temperature fails to be greater than said predetermined value.

According to another aspect of the present invention, there is provided a system for controlling an ignition timing in an internal combustion engine having a start switch, comprising:

a crank angle sensor arranged to generate a train of pulses including a train of leading pulses and a train of trailing pulses, said crank angle sensor having a shaft driven by the engine, a rotor plate coaxially coupled with said shaft, a source of light arranged on one face side of said rotor plate, and a photo-electric transducer arranged on the other face side of said rotor plate and corresponding to said source of light, said rotor plate being formed with a first group of slits designed for detecting a first cylinder angular position, a second group of slits designed for a second cylinder angular position, and a third group of a slit designed for detecting an angular position of a specified cylinder, said first group of slits being equi-angularly distant from one another and arranged within a predetermined annular band within said rotor plate, said second group of slits being equi-angularly distant from one another and arranged within said predetermined annular band, each of said slits belonging to said first group being located adjacent to the corresponding one of said slits belonging to said second group, said source of light and said photo-electric transducer being disposed above said predetermined annular band;

means for determining whether the start switch is turned ON or not;

means for determining whether an engine temperature is greater than a predetermined value or not; and means for carrying out an ignition at a falling edge of each of said trailing pulses when said engine temperature is greater than said predetermined value, and at a falling edge of each of said leading pulses when said engine temperature fails to be greater than said predetermined value.

BRIEF DESCRIPTION OF THE DRAWINGS

FIG. 8 is a flowchart showing a control when FLAGA=2 in FIG. 4B.

DETAILED DESCRIPTION OF THE INVENTION

Referring to the accompanying drawings, preferred embodiments of the present invention will be described.

Figure 3:
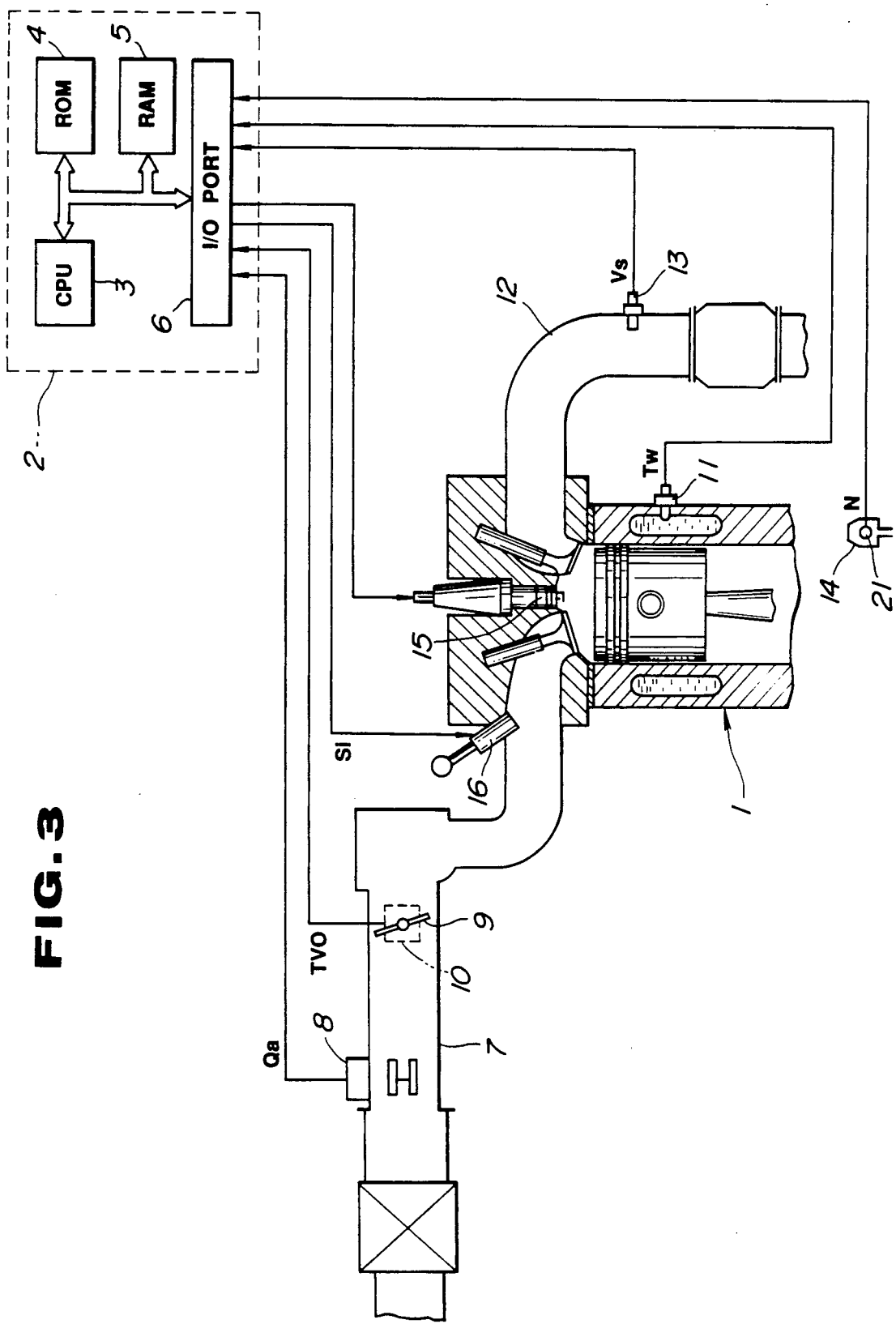
FIG. 3 is a schematic illustration showing an overall configuration of a four-cycle four-cylinder internal combustion engine to which a preferred embodiment of an ignition timing control system according to the present invention is applied.

Referring first to FIG. 3, a four-cycle four-cylinder internal combustion engine 1 is of the electronically controlled type. A microcomputer 2 functions as a controller, and includes a central processing unit (CPU) 3, a read-only memory (ROM) 4, a random access memory (RAM) 5, and an input/output (I/O) port 6. The microcomputer 2 receives an intake air amount signal Qa derived from an airflow meter 8 which is installed in an intake pipe 7, an opening degree signal TVO derived from an opening degree detecting sensor 10 which is installed in a throttle valve 9, a coolant temperature signal Tw derived from a coolant temperature sensor 11, a reference voltage signal Vs derived from an $O_2$ sensor 13 which is installed in an exhaust pipe 12, and an engine revolution speed signal N derived from a crank angle sensor 21 of the photo-electric type. Then, the microcomputer 2 detects a current engine operating condition, provides an ignition timing signal to each ignition plug 15 after executing an optimum ignition timing control, and also provides a fuel injection signal to a fuel injection valve 16 after executing a fuel injection amount control.

Figure 1:
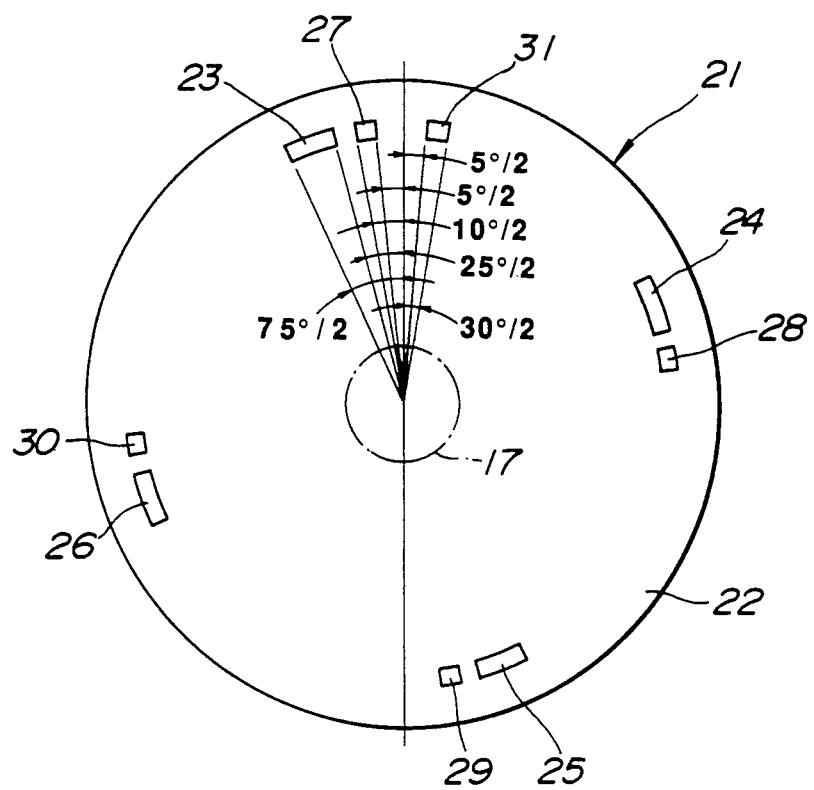
FIG. 1 is a plan view illustrating a preferred embodiment of a rotor plate for a crank angle sensor according to the present invention.
Figure 1A:
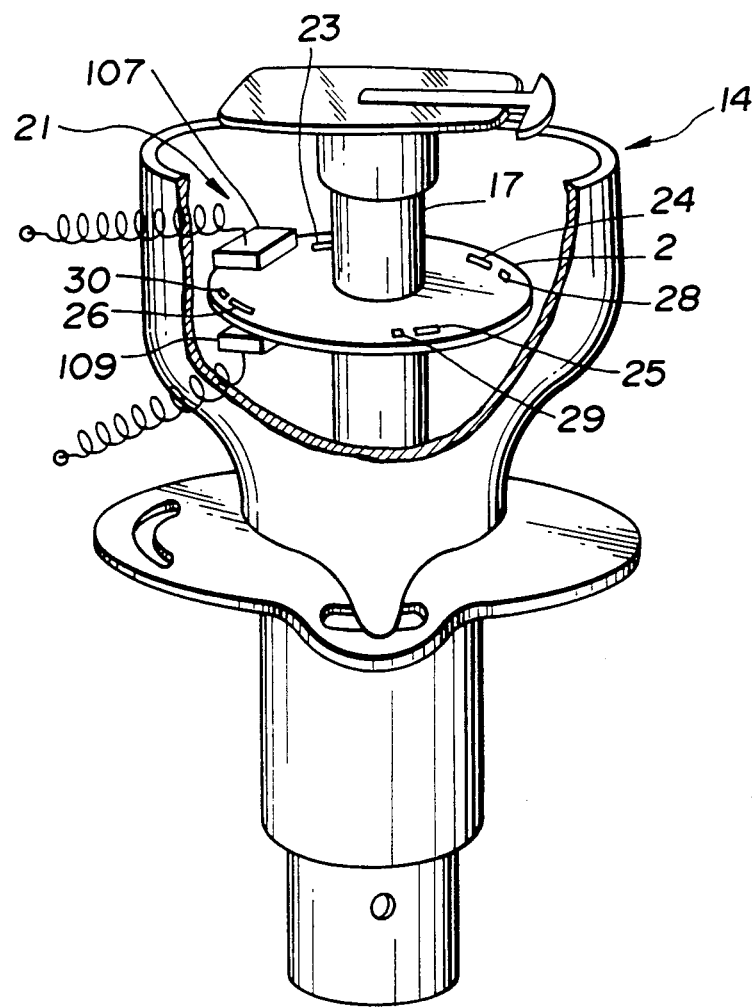
FIG. 1A is a partly broken perspective view illustrating a distributer with the crank angle sensor.

Referring to FIGS. 1 and 1A, the crank angle sensor 21 is incorporated in a distributer 14, and includes a rotor plate 22 connected to a disc shaft 17, a source of light or a light emitting diode (LED) 107 and a photo-electric transducer or a light receiving diode (LRD) 109 which are arranged over and under the rotor plate 22, respectively, and a signal processing unit (not shown). The rotor plate 22 is formed, on the same circumference, with four first signal slits 23, 24, 25, and 26 corresponding to first, second, third, and fourth cylinders, four second signal slits 27, 28, 29, and 30 which stand apart from the four first signal slits 23, 24, 25, and 26 by a predetermined angle of circumference, respectively, and correspond also to the first, second, third, and fourth cylinders, and a single cylinder identification reference signal slit 31.

The four first signal slits 23, 24, 25, and 26 are set so as to have the same length in the circumferential direction, and are disposed symmetrically with the disc shaft 17 as a center, i.e., at equal spatial intervals of 90° (=180° crank angle). Similarly, the four second signal slits 27, 28, 29, and 30 are set so as to have the same length in the circumferential direction, and are disposed symmetrically with the disc shaft 17 as a center. Each length of the first slits 23 through 26 is set, as indicated by a wave form chart (a) in FIG. 2, such that a corresponding pulse signal or a leading pulse rises in the vicinity of about 75° crank angle (°CA) before a top dead center (TDC) in a compression stroke of the crank rotational angle, and falls in the vicinity of about 25° CA before the TDC. On the other hand, each length of the second slits 27 through 30 is set such that a corresponding pulse signal or a trailing pulse rises in the vicinity of about 10° CA before the TDC, and falls in the vicinity of about 5° CA before the TDC. In this manner, each width from a high (H) level edge to a low (L) level edge of the first signal slits 23 through 26 and the second signal slits 27 through 30 is determined.

A length of the reference signal slit 31 in the circumferential direction is set so as to be shorter than the length of each of the first and second slits 23 through 30. The reference signal slit 31 is disposed in the vicinity of the first signal slit 23, i.e., within about 30° CA after the TDC. The H level edge of the reference signal slit 31 is set at the position of about 5° CA after the TDC.

Figure 2:
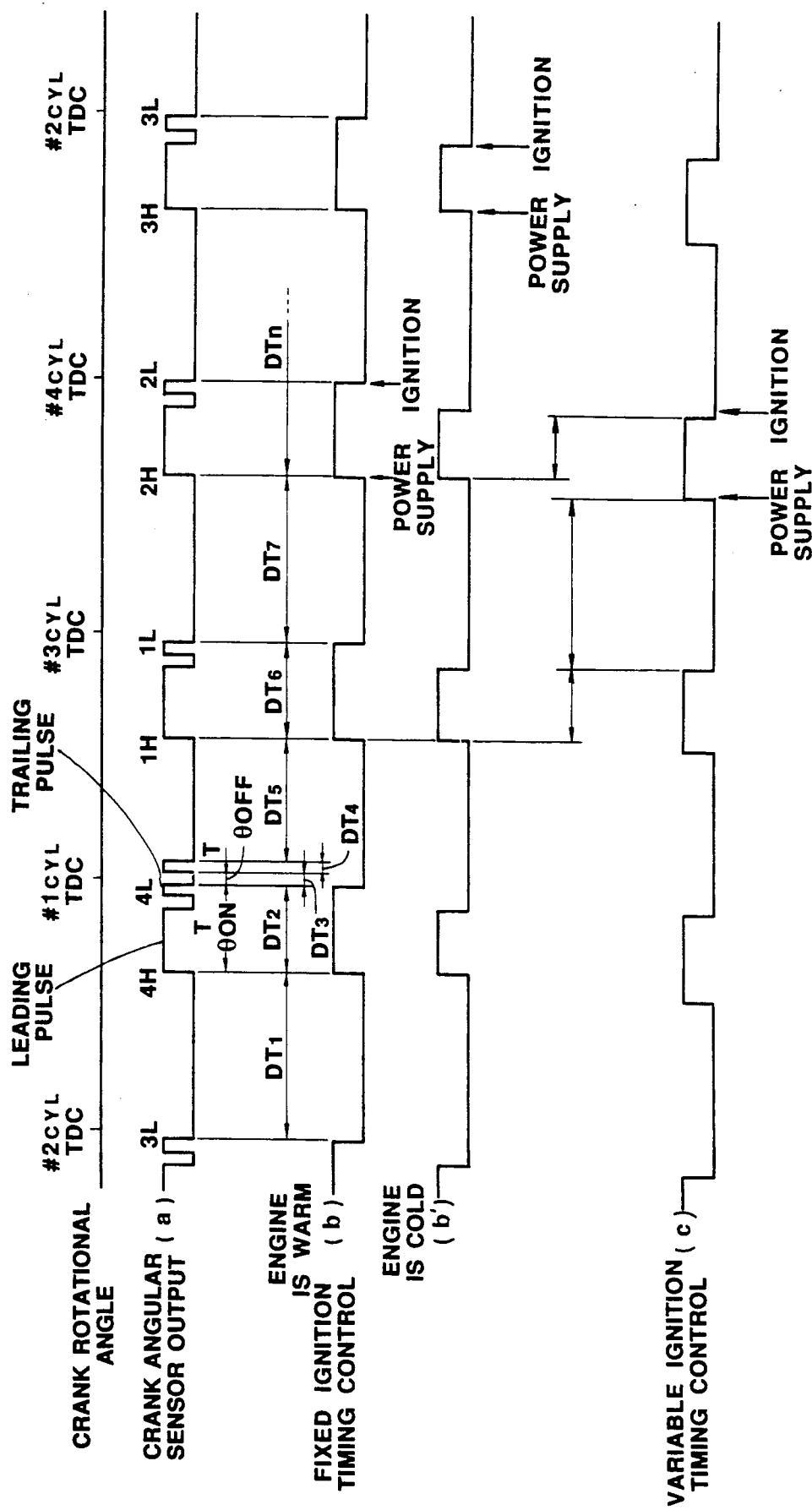
FIG. 2 is a wave form chart showing pulse signals outputted by the crank angle sensor.

The light passing through each of the slits 23 through 31 causes an 180° CA signal as indicated by the wave form chart (a) in FIG. 2, and an ON-OFF pulse signal of a cylinder identification reference signal to be generated.

The microcomputer 2 which receives each of the pulse signals measures a time between the 180° CA signals to derive the engine revolution speed N, and carries out a variable ignition timing control based on an ignition timing value data which is derived from a function between the engine revolution speed N and the intake air amount signal Qa from the airflow meter 8 and is previously stored in the RAM 5 (refer to a wave form chart (c) in FIG. 2). The microcomputer 2 also carries out a fixed ignition timing control according to the engine revolution speed N, not using the ignition timing value data when the engine is idling or decelerating (refer to wave form charts (b) and (b') in FIG. 2). It is to be noted that a high (H) or ON level width of the 180° CA pulse signal is 70° CA and a low (L) or OFF level width thereof is 110° CA. Accordingly, when the engine 1 is warm, the H level width is 70° CA, and the L level width is 110° CA. On the other hand, when the engine 1 is cold, the H level width is 50° CA, and the L level width is 130° CA. It is also to be noted that, in the above-mentioned fixed ignition timing control, a power supply duration is the same as the 180° CA pulsewidth and the ignition timing is the same as the timing of the falling edge of the pulse signal. On the other hand, in the variable ignition timing control, the power supply duration is given by a power supply angle which is derived from a power supply duration data stored in the ROM 4 of the microcomputer 2, and the ignition timing is set to an advance angle timing of a predetermined angle based on an H level of the 180° CA signal.

Additionally, the microcomputer 2 carries out the fuel injection control according to the engine driving condition. In the initial stage of engine start, for example, a simultaneous fuel injection for all cylinders is carried out base on the crank angular position detecting signal. On the other hand, under a predetermined driving condition, a so-called sequential injection is carried out: fuel is sequentially injected before the TDC in the compression stroke of each of the cylinders base on the crank angular position detecting signal and the cylinder identification reference signal.

Figure 4A:
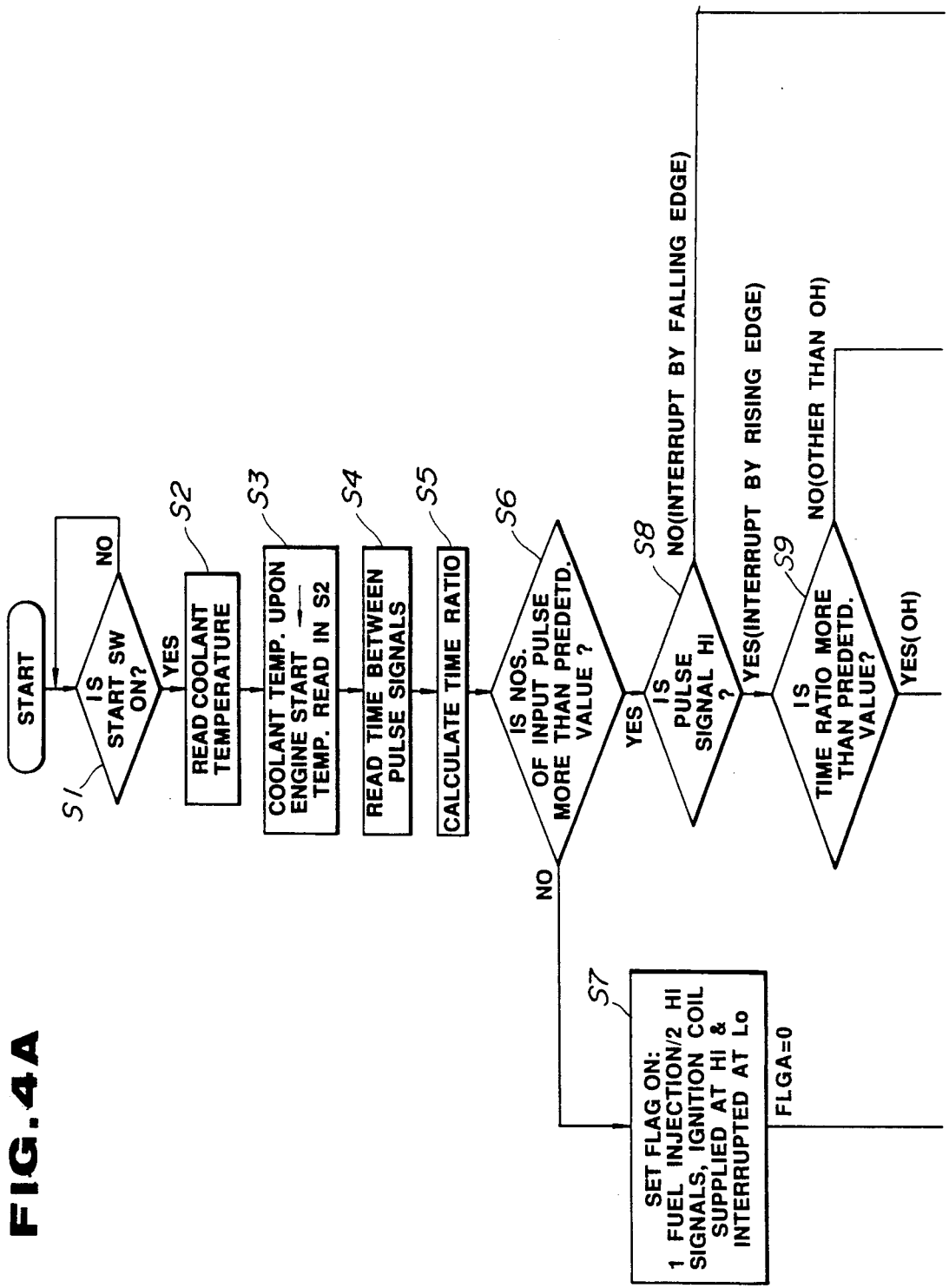
FIGS. 4A and 4B are flowcharts showing a basic control executed by a microcomputer shown in FIG. 3.
Figure 4B:
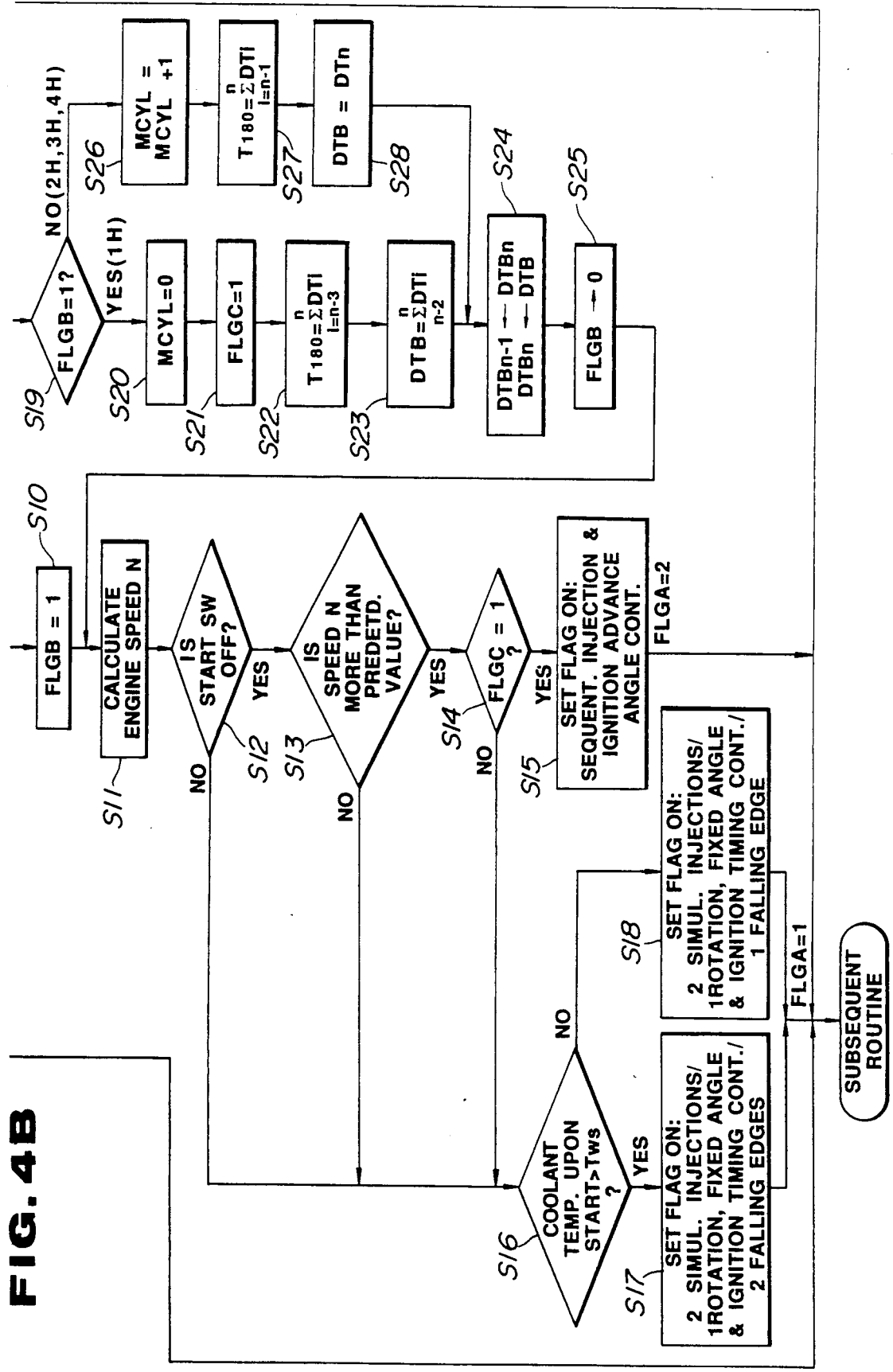

Referring to FIGS. 4a and 4b, a description will be made with regard to a basic control executed by the microcomputer 2.

A basic routine shown in FIGS. 4a and 4b is interrupted on the rising edge or the falling edge of the pulse signal outputted from the crank angle sensor 21.

In a step S1, it is determined whether a start switch is turned ON or not. If the start switch is turned ON, the routine proceeds to a step S2 in which a coolant temperature is read in the RAM 5. Subsequently, in a step S3, a value of the coolant temperature read in the step S2 is set as that upon engine start.

In a subsequent step S4, a time between the pulse signals ($DT_1$ through $DT_n$ in FIG. 2) is read in the RAM 5, then the routine proceeds to a step S5 in which a time ratio (DDT) is obtained from the following expression: $DT_{n-1}/DT_n$. In a step S6, it is determined whether a number of occurrences of the pulse signal inputted is more than a predetermined value or not after turning ON the start switch. If the answer to the inquiry in the step S6 is NO, i.e., the number of occurrences of the input pulse signal is less than, for example, 5 during less than two rotations of a crankshaft such as in the initial stage of engine start, the cylinder number is not identified. Thus, the routine proceeds to a step S7.

Figure 6:
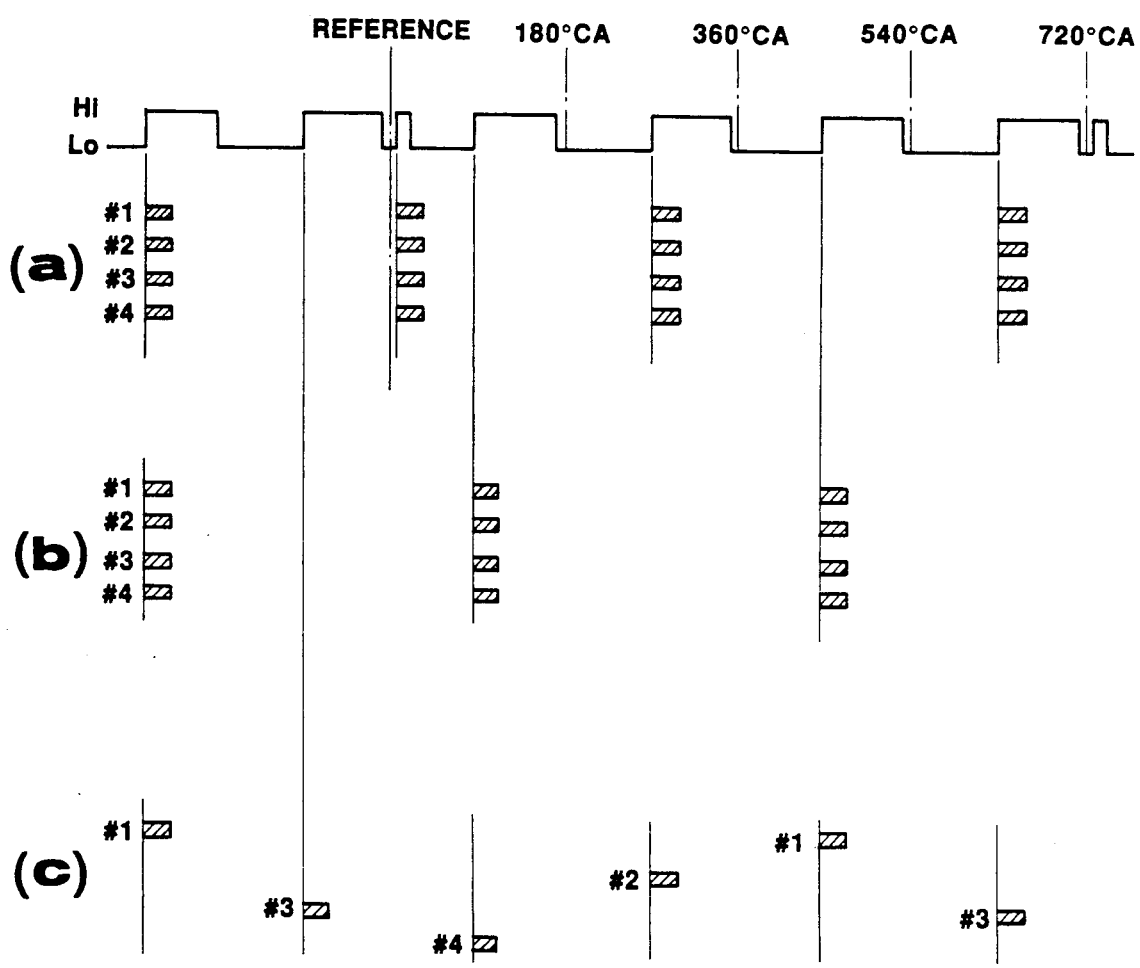
FIGS. 6(*a-c*) is a chart showing a fuel injection.

In the step S7, a flag FLAGA is set to 0 (zero) indicating that the fuel injection is carried out once for every two occurrences of the H level signal, and a primary ignition coil is supplied with electricity at the H level signal and interrupted at the L level signal, as illustrated by a chart (a) in FIG. 6, then the routine proceeds to a subsequent routine as will be described hereinafter. On the other hand, if the answer to the inquiry in the step S6 is YES, the routine proceeds to a step S8 in which it is determined whether the pulse signal is at the H level or not. If the pulse signal is not at the H level, the routine proceeds to the subsequent routine in response to an interrupt caused by the rising edge of the pulse signal.

In the step S8, if the pulse signal is at the H level, the routine proceeds to a step S9 in which it is determined whether the time ratio obtained in the step S5 is more than a predetermined value or not. Specifically, it is determined whether a ratio of a previous H level angle $\theta_{ON}$ (theta ON) to a current L level angle $\theta_{OFF}$ (theta OFF) is more than, for example, 3, or not (refer to FIG. 2). It is to be noted that the predetermined value is set to "more than 3" so as to allow the resolution of a pulse-width to be exhibited, and a fixed advance angle range (5° CA through 10° CA) of the ignition timing to be achieved. If the ratio $\theta_{ON}/\theta_{OFF}$ is more than 3, i.e., the cylinder identification reference signal is at the H level (OH) once for every five occurrences thereof, the routine proceeds from the step S9 to a step S10 in which a flag FLAGB indicative of the cylinder identification is set to 1, thus simply identifying the cylinder number.

In a step S11, the normal engine revolution speed N is calculated based on a measured time $T_{180}$ between the 180° CA signals as will be described hereinafter from the following expression: $N = 60/2 \times T_{180}$. In a subsequent step S12, it is determined whether the start switch is turned OFF or not. If the start switch is turned OFF, the routine proceeds to a step S13 in which it is determined whether the engine revolution speed N is more than, for example, 400 r.p.m., or not. If the engine revolution speed N is more than 400 r.p.m., the routine proceeds to a step S14 in which it is determined whether a flag FLAGC is set to 1 or not. Specifically, in the steps S12, S13, and S14, it is determined whether all conditions such as state of the start switch, a value of the engine revolution speed N, etc. allow the sequential control or not. If all the answers to the inquiries in the steps S12, S13, and S14 are YES, the routine proceeds to a step S15 in which the FLAGA is set to 2 indicating that the sequential fuel injection control and the ignition advance angle control are carried out as illustrated by a chart (c) in FIG. 6, then the routine proceeds to a subsequent routine as will be described hereinafter.

On the other hand, if the answer to the inquiry in any one of the steps S12, S13, and S14 is NO, the routine proceeds to a step S16 in which it is determined whether the coolant temperature upon engine start is greater than a predetermined value $T_{ws}$ or not, i.e., whether the engine is warm or cold. If the coolant temperature upon engine start is greater than the predetermined value $T_{ws}$, i.e., the engine is warm, the routine proceeds to a step S17 in which the flag FLAGA is set to 1 indicating that the simultaneous fuel injection is carried out twice every one rotation of the crankshaft, and that the fixed power supply angle and ignition timing controls are executed every two falling edges, as illustrated by a chart (b) in FIG. 6, then the routine proceeds to a subsequent routine as will be described hereinafter. On the other hand, if the coolant temperature upon engine start is equal to or less than the predetermined value $T_{ws}$, i.e., the engine is cold, the routine proceeds from the step S16 to a step S18 in which the FLAGA is set to 1 indicating that the simultaneous fuel injection is carried out twice for every one rotation of the crankshaft, and that the fixed power supply angle and ignition timing controls are executed once for every one falling edge, then the routine proceeds to the subsequent routine.

In the step S9, if the answer to the inquiry is NO, i.e., in a case except that the cylinder identification reference signal is at the H level (OH), the routine proceeds to a step S19 in which it is determined whether the flag FLAGB is set to 1 or not, i.e., whether the cylinder identification reference signal is present or not. If the FLAGB is set to 1, the routine proceeds to a step 20 in which an M cylinder (MCYL) is set to 0 (zero), thus setting a reference. It is to be noted that the MCYL is a variable using numbers 0, 1, 2, and 3, and corresponds to an order of the ignition and the fuel injection. With the four-cylinder engine 1, for example, the MCYL corresponds to from 75° CA before a bottom dead center in an explosion stroke to 105 CA after the bottom dead center in the explosion stroke for the first cylinder when the number is 0 (zero), the third cylinder when the number is 1, the fourth cylinder when the number is 2, and the second cylinder when the number is 3, respectively. It is also to be noted that, if FLGB=1 in the step S19, the MCYL is set to 0 (zero).

In a subsequent step S21, the flag FLAGC is set 1. Then, in a step S22, in order to obtain the engine revolution speed N as described hereinbefore, the time $T_{180}$ between 180° CA signals is calculated based on an expression:

$$\sum_{i=n-3}^{n} DT_i.$$

Specifically, since MCYL=0 in the step 20, the time $T_{180}$ is measured by adding four time durations: $DT_2+DT_3+DT_4+DT_5$. In a subsequent step S23, in order to set a reference of the ignition timing, a time DTB between the L level signals (110° CA) of the 180° CA signal is calculated. In this case, since the cylinder identification reference signal is present, the time DTB is calculated based on an expression:

$$\sum_{i=n-2}^{n} DT_i,$$

which includes this reference signal. That is, it is measured by adding three time durations: $DT_3+DT_4+DT_5$.

Subsequently, in a step S24, the time DTB between the L level signals is updated in turn, and a new reference of the ignition timing is set, and stored in the RAM 5. This new reference is used for calculating a term of the angular acceleration. In a step S25, the flag FLAGB is set to 0 (zero). It is to be noted that FLAGB=0 indicates that the cylinder identification reference signal is not present. In this case, since MCYL=0 in the step S20, the third cylinder is identified if 0+1, the fourth cylinder is identified if 0+2, and so forth. Then, the routine proceeds from the step S25 to the step S11 as described hereinbefore.

On the other hand, if the answer to the inquiry in the step S19 is NO, it indicates that the cylinder identification reference signal is not present. Thus, the routine proceeds to a step S26 in which the MCYL is incremented by 1. In a step S27, the time $T_{180}$ between 180° CA signals is calculated based on an expression:

$$\sum_{i=n-1}^{n} DT_i.$$

In a subsequent step S28, the time DTB between the L level signals is calculated based on the time $DT_n$, then the routine proceeds to the step S24 as described hereinbefore.

Next, descriptions will be made with regard to the routines when FLAGA=0, FLAGA=1, and FLAGA=2, respectively.

Figure 5:
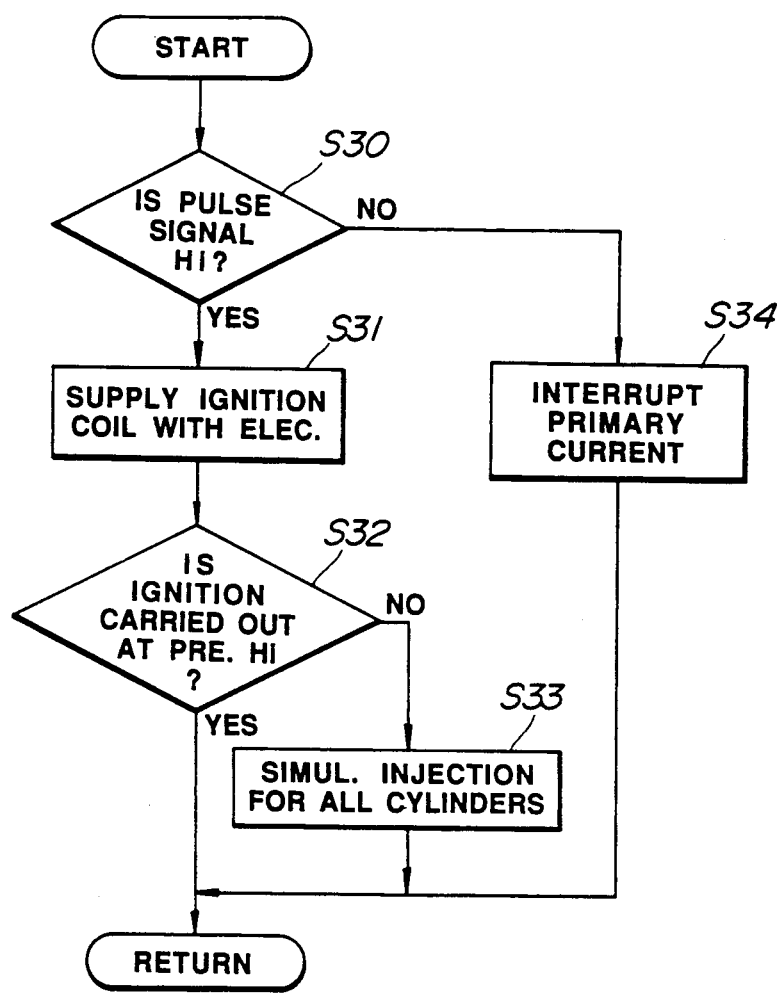
FIG. 5 is a flowchart showing a control when FLAGA=0 in FIG. 4A.

Referring first to FIG. 5, the routine when FLAGA=0 will be described. In this case, the cylinder number is not yet identified. Subsequently to the step S7, the routine proceeds to a step S30 in which it is determined again whether the pulse signal is at the H level or not. If the answer to the inquiry in the step S30 is YES, the routine proceeds to a step S31 in which the electricity is supplied to the primary ignition coil at a crank angle in the vicinity of about 75° CA before the top dead center (TDC) in the compression stroke. In a subsequent step S32, it is determined whether an ignition is carried out at the H level of a previous pulse signal or not. If the answer to the inquiry in the step S32 is YES, the routine returns to START without any processing, whereas if NO, the routine proceeds to a step S33 in which the simultaneous fuel injection for all cylinders is carried out. Specifically, in the step S33, as shown in FIG. 6, the simultaneous fuel injection is carried out once for every two occurrences of the H level signal, i.e., it takes place five times for every four rotations of the crankshaft. The same result can be obtained by performing the simultaneous fuel injection once for every two occurrences of the L level signal. This contributes to improvement in a startability of the engine 1 and a stability of the rotation thereof.

On the other hand, in the step S30, if the pulse signal is not at the H level, the routine proceeds to a step S34 in which the electricity to the primary ignition coil is interrupted, i.e., the ignition is carried out at the crank angle in the vicinity of about 5° CA before the TDC in the compression stroke. Then, the routine returns to START.

It is to be noted that, in such a condition that the cylinder number is not identified, the ignition is carried out upon occurrence of the cylinder identification reference signal as well as the above-mentioned crank angular position detecting signal. Since the cylinder identification reference signal is generated at about 5° CA after the TDC in the compression stroke, and the ignition is carried out immediately after the compression stroke, combustion within the engine is not subjected to any bad influence.

Figure 7:
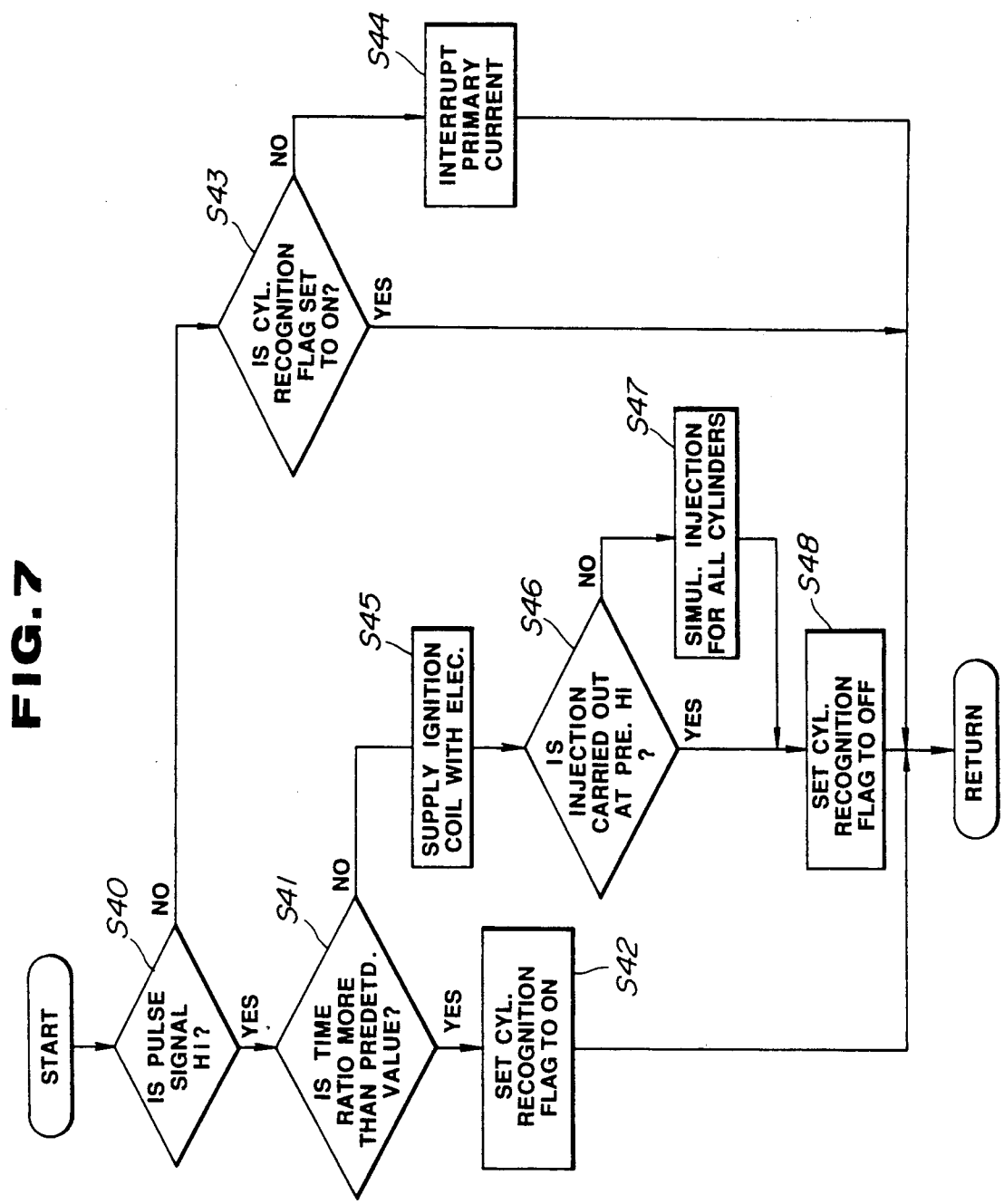
FIG. 7 is a flowchart showing a control when FLAGA=1 in FIG. 4B.

Referring to FIG. 7, the routine when FLAGA=1 will be described. In this case, the cylinder number has been identified, and the engine falls into a driving condition such as a start-up. Subsequently to the step S18, the routine proceeds to a step S40 in which it is determined whether the pulse signal is at the H level or not. If the pulse signal is at the H level, the routine proceeds to a step S41 in which it is determined whether the time ratio is more than a predetermined value or not, i.e., more than 3 or not. If the time ratio is more than 3, a flag indicative of the cylinder identification is set to ON state, then the routine returns to START. On the other hand, if the answer to the inquiry in the step S40 is NO, the routine proceeds to a step S43 in which it is determined whether the flag indicative of the cylinder identification is set to the ON state or not. If the answer to the inquiry in the step S43 is YES, the routine returns to START, whereas if NO, the routine proceeds to a step S44. In the step S44, the electricity to the primary ignition coil is interrupted, and the ignition begins to take place based on the above-mentioned fixed ignition timing control.

On the other hand, if the time ratio is not more than 3, i.e., when the pulse signal other than the cylinder identification reference signal is at the H level, the routine proceeds to a step S45 in which the electricity is supplied to the primary ignition coil. In a subsequent step S46, it is determined whether the fuel injection is carried out at the H level of the previous pulse signal or not. If the answer to the inquiry in the step S46 is YES, the routine proceeds to a step S48 in which the flag indicative of the cylinder identification is set to OFF state. Then, the routine returns to START. If the answer in the step S46 is NO, the routine proceeds to a step S47 in which the simultaneous fuel injection for all cylinders is carried out twice for every one rotation of the crankshaft.

Referring to FIG. 8, the routine when FLAGA = 2 will be described. Subsequent to step S15, the routine proceeds to a step S50 in which it is determined whether the pulse signal is at the H level or not. If the answer to the inquiry in the step S50 is NO, the routine returns to START, whereas if YES, the routine proceeds to a step S51 in which it is determined whether the time ratio is more than 3 or not. If the time ratio is more than 3, the routine returns to START. On the other hand, if the time ratio is not more than 3, the routine proceeds to a step S52 in which the ignition/power supply based on the variable ignition control is carried out in each cylinder corresponding to the MCYL according to the sequential control, and also the fuel injection is carried out for each of the cylinders. Then, the routine returns to START.

With such an ignition timing control system, since the slits 23 through 31 are disposed on the same circumference of the rotor plate 22, a simple structure thereof can be achieved, resulting in easy machining work and reduction of manufacturing cost.

Further, in the initial stage of engine start where the cylinder number cannot be identified, since the advance angle is changeable from a value when the engine 1 is cold to the same after the engine 1 is warm, the result is an improvement in the startability when the engine 1 is cold.

Still further, since the cylinder identification reference signal slit 31 is disposed within about 30° CA after the top dead center (TDC) in the compression stroke, the ignition is carried out surely before and immediately after the TDC even if it takes place base on the cylinder identification reference signal as well as the crank angular position detecting signal in the event the cylinder number cannot be identified such as in the initial stage of engine start. As a result, the ignition in the suction stroke is surely prevented from taking place.

Having described the preferred embodiment in which the present invention is applied to the four-cylinder engine 1, it is to be noted that the present invention is not limited to such an application, and also applicable to six-cylinder and eight-cylinder engines.

Further, it is to be noted that, for detecting the engine temperature, a lubricating oil temperature sensor and a cylinder head temperature sensor can be used in place of the coolant temperature sensor 11.

What is claimed is:

1. A system for controlling an ignition timing in an internal combustion engine having a start switch, comprising:
   means for generating a train of pulses including a train of leading pulses and a train of trailing pulses superimposed on each other;
   means for determining whether the start switch is turned ON or not;
   means for determining whether an engine temperature is greater than a predetermined value or not; and
   means for carrying out an ignition at a falling edge of each of said trailing pulses when said engine temperature is greater than said predetermined value, and at a falling edge of each of said leading pulses when said engine temperature fails to be greater than said predetermined value.

2. A method of controlling an ignition timing in an internal combustion engine having a start switch, comprising:
   generating a train of pulses including a train of leading pulses and a train of trailing pulses superimposed on each other;
   determining whether the start switch is turned ON or not;
   determining whether an engine temperature is greater than a predetermined value or not;
   carrying out an ignition at a falling edge of each of said trailing pulses when said engine temperature is greater than said predetermined value; and
   carrying out an ignition at a falling edge of each of said leading pulses when said engine temperature fails to be greater than said predetermined value.

3. A system for controlling an ignition timing in an internal combustion engine having a start switch, comprising:
   a crank angle sensor arranged to generate a train of pulses including a train of leading pulses and a train of trailing pulses, said crank angle sensor having a shaft driven by the engine, a rotor plate coaxially coupled with said shaft, a source of light arranged on one face side of said rotor plate, and a photoelectric transducer arranged on the other face side of said rotor plate and corresponding to said source of light,
   said rotor plate being formed with a first group of slits designed for detecting a first cylinder angular position, a second group of slits designed for a second cylinder angular position, and a third group of a slit designed for detecting an angular position of a specified cylinder, said first group of slits being equi-angularly distant one after another and arranged within a predetermined annular band within said rotor plate, said second group of slits being equi-angularly distant one after another and arranged within said predetermined annular band, each of said slits belonging to said first group being located adjacent to the corresponding one of said slits belonging to said second group,
   said source of light and said photo-electric transducer being disposed above said predetermined annular band;
   means for determining whether the start switch is turned ON or not;
   means for determining whether an engine temperature is greater than a predetermined value or not; and
   means for carrying out an ignition at a falling edge of each of said trailing pulses when said engine temperature is greater than said predetermined value, and at a falling edge of each of said leading pulses when said engine temperature fails to be greater than said predetermined value.

* * * * *